United States Patent [19]

Atkisson, Jr.

[11] 4,064,423
[45] Dec. 20, 1977

[54] DIGITAL SYSTEM AND METHOD FOR GENERATING ANALOG CONTROL SIGNALS

[75] Inventor: James B. Atkisson, Jr., Santa Clara, Calif.

[73] Assignee: Applied Materials, Inc., Palo Alto, Calif.

[21] Appl. No.: 640,046

[22] Filed: Dec. 12, 1975

[51] Int. Cl.² ............................................... G06G 7/28
[52] U.S. Cl. ....................................... 364/718; 328/14; 340/347 DA
[58] Field of Search ................ 340/347 DA; 235/197, 235/150.53; 328/14

[56] References Cited

U.S. PATENT DOCUMENTS

| | | | |
|---|---|---|---|
| 2,886,243 | 5/1959 | Sprague et al. | 235/197 X |
| 3,529,138 | 9/1970 | Andre et al. | 235/197 X |
| 3,557,347 | 1/1971 | Robertson | 235/197 X |
| 3,564,535 | 2/1971 | Ward et al. | 235/197 X |
| 3,729,625 | 4/1973 | Inoue | 235/197 |
| 3,813,528 | 5/1974 | Blanding | 235/197 X |
| 3,939,459 | 2/1976 | Hoopes | 340/347 NT |

OTHER PUBLICATIONS

Analog Devices, Inc. "Analog–Digital Conversion Handbook," 6/72, pp. I-93 to I-102.
Analog Devices, Inc., Analog–Digital Conversion Handbook, 6/1972, pp. I-8,9,42,43,68–71.

Primary Examiner—Thomas J. Sloyan
Attorney, Agent, or Firm—Flehr, Hohbach, Test, Albritton & Herbert

[57] ABSTRACT

Digital system and method for generating analog control signals wherein a plurality of straight line segments are fitted to the desired wave form, and signals representative of the changes in amplitude and time for each segment are stored in a digital memory. The amplitude and time signals are processed to provide digital signals corresponding to a plurality of points disposed generally along the line segments, and these digital signals are converted to analog form to provide an output signal which increases and/or decreases in a plurality of incremental steps at a rate corresponding to the slopes of the line segments.

14 Claims, 3 Drawing Figures

| SEGMENT | AMP CHANGE | TIME CHANGE | SLOPE | JUMP | EVENT 1 | EVENT 2 |
|---|---|---|---|---|---|---|
| 0 | 2 | 6 | + |  | ON | OFF |
| 1 | 2 | 4 | + |  |  |  |
| 2 | 3 | 3 | + |  |  |  |
| 3 | 5 | 3 | + |  |  |  |
| 4 | 8 | 4 | + |  |  |  |
| 5 | 3 | 1 | + |  | OFF |  |
| 6 | 29 | 8 | + |  |  |  |
| 7 | 5 | 2 | + |  |  |  |
| 8 | 2 | 2 | + |  |  |  |
| 9 | 1 | 2 | + |  |  |  |
| 10 | 1 | 2 | − |  |  |  |
| 11 | 2 | 1 | − |  |  |  |
| 12 | 9 | 3 | − |  |  |  |
| 13 | 3 | 2 | − |  |  |  |
| 14 | 1 | 2 | − |  |  |  |
| 15 | 0 | 15 |  |  |  | ON |

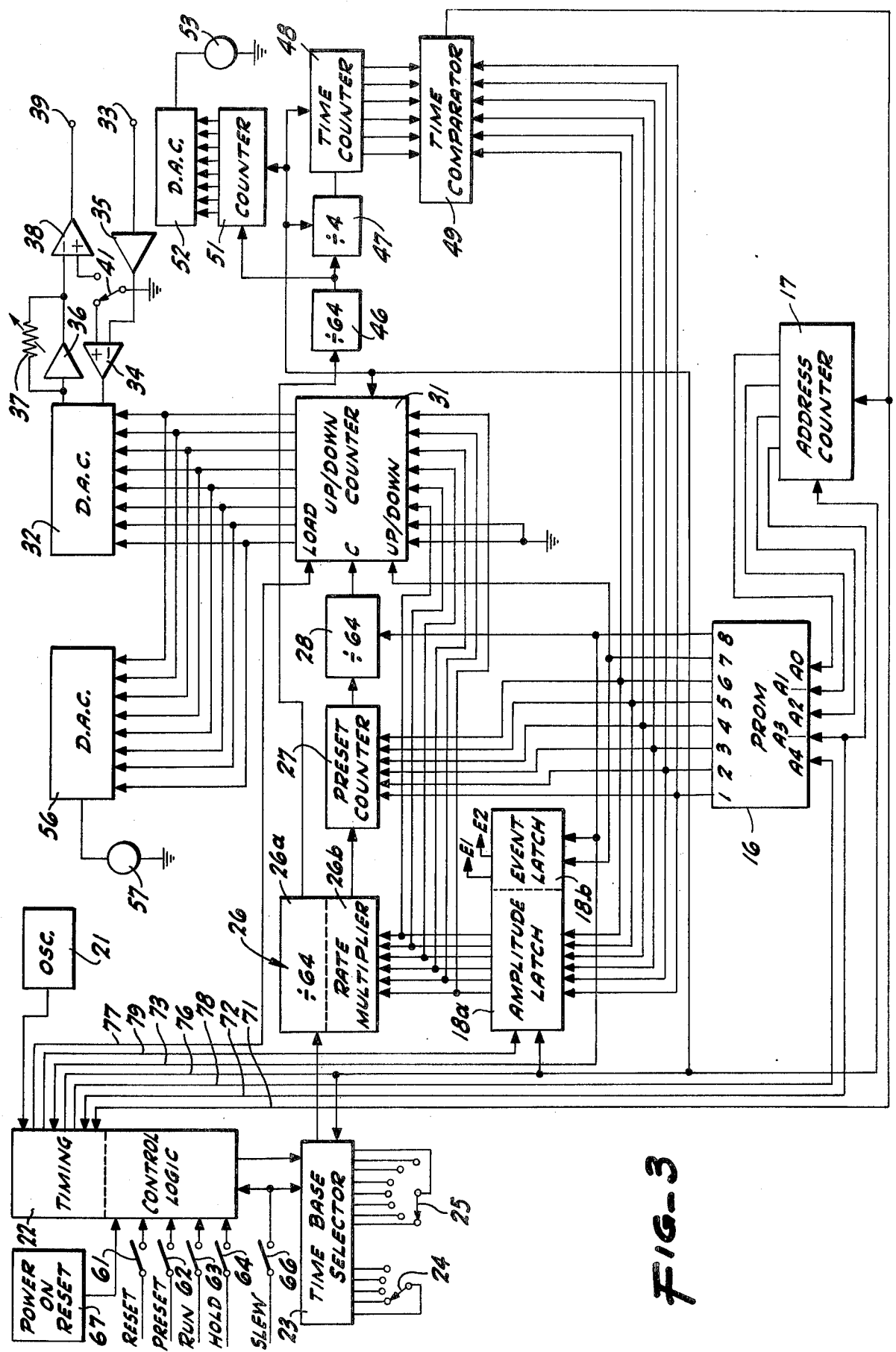

DIGITAL SYSTEM AND METHOD FOR GENERATING ANALOG CONTROL SIGNALS

BACKGROUND OF THE INVENTON

This invention pertains generally to process controllers and more particularly to a digital system and method for generating time variant electrical analog signals for controlling processes, machines and other equipment.

Time variant electric analog signals are utilized in a wide variety of industrial and other applications for controlling a process or the operation of a machine, instrument or other equipment to provide accurate results which are readily repeatable. Such applications include the start-up of furnaces and reactors, the introduction of reactants, control of welding currents, regulation of flow and control of pressure and temperature. The desired control signals are often derived indirectly and have complex wave forms.

Heretofore, process control signals have been generated primarily by mechanical techniques or a combination of electrical and mechanical techniques. In one widely used prior art approach, a cam is formed with a profile corresponding to the wave form of a desired control signal, and a cam follower driven by the cam controls the movement of a potentiometer to generate the analog signal. In another prior art approach, a line corresponding to a desired wave form is scribed into an electrically conductive layer on an insulative card, and a servomotor controlled pick-up device follows the line and controls the operation of a potentiometer to generate the desired signal. Although widely used, such systems have certain limitations and disadvantages. For example, mechanical inertia prevents the generation of signals whih change instantaneously in amplitude and it is generally not possible for the control signals to begin and end at different levels. The mechanical parts are subject to friction and wear which can lead to inaccurate results and ultimate failure of the system, and the range of time bases which such systems can provide is limited.

SUMMARY AND OBJECTS OF THE INVENTION

The invention provides a digital system and method for generating analog control signals wherein a plurality of straight line segments are fitted to the desired wave form, and signals representative of the changes in amplitude and time for each segment are stored in a digital memory. The amplitude and time signals are processed to provide digital signals corresponding to a plurality of points disposed generally along the lines, and the digital signals are converted to analog form to provide an output signal which increases and/or decreases in a plurality of incremental steps at a rate corresponding to the slopes of the line segments. Means is included for transferring the amplitude signals directly to the digital output in the event of an instantaneous change in the amplitude of the analog signals, and means is also included for dividing the digital signals by a predetermined number chosen to provide a smoother and more symmetrical output wave form.

It is in general an object of the invention to provide a new and improved system and method for generating an analog control signal of predetermined wave form.

Another object of the invention is to provide a system and method of the above character utilizing digital techniques.

Additional objects and features of the invention will be apparent from the following description in which the preferred embodiments are set forth in detail in conjunction with the accompanying drawings.

BRIEF DESCRIPTION OF THE DRAWINGS

FIG. 3 is a block diagram of one embodiment of a digital system for generating an analog control system according to the invention.

DESCRIPTION OF THE PREFERRED EMBODIMENTS

Figures 1, 2:
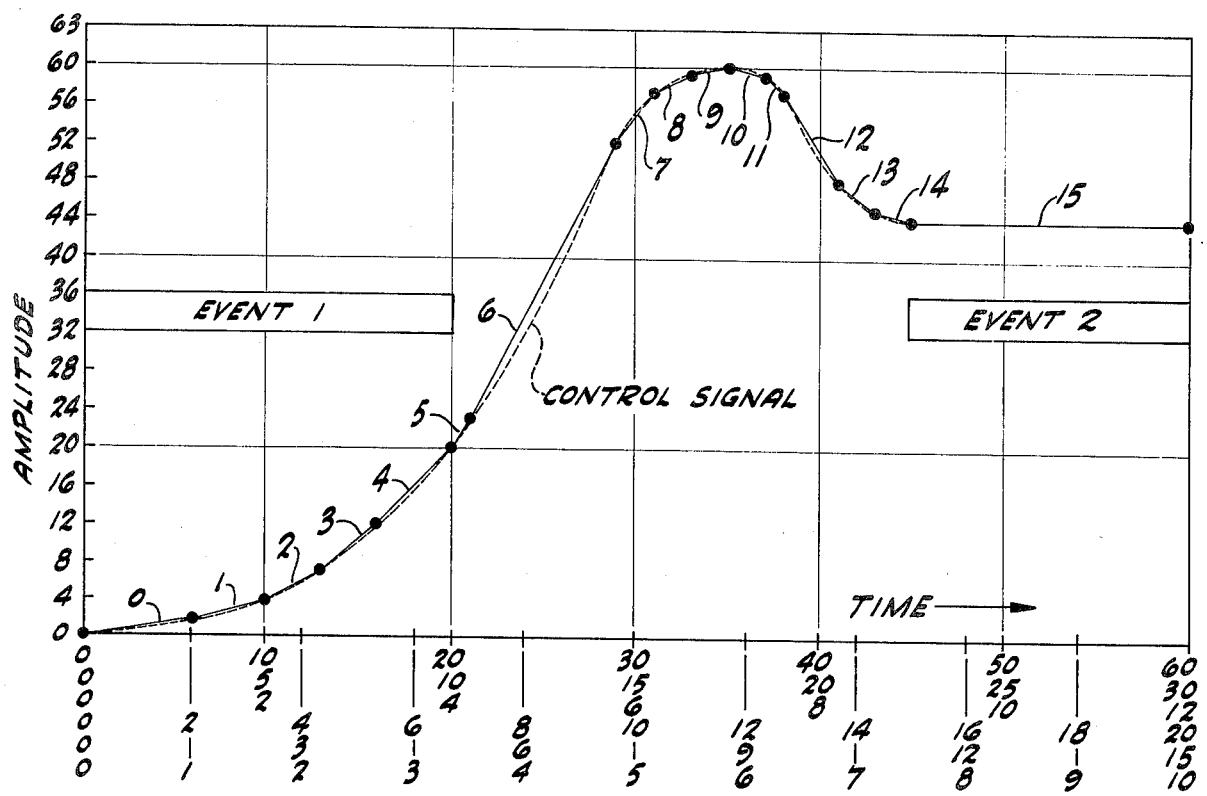
FIG. 1 is a graphical representation of the manner in which straight line segments are fitted to the desired wave form of the control signal.
FIG. 2 is a programming table for the wave form of FIG. 1.

As illustrated in FIG. 1, the wave form of the desired output or control signal is plotted on a Cartesian system with amplitude represented along the vertical axis and time represented along the horizontal axis. A plurality of straight line segments 0–15 are fitted to the wave form and extend between predetermined points thereof, the number of segments and the location of the points being chosen to make the line segments conform to the wave form as closely as desired. Generally, the line segments are chosen to coincide with linear portions of the wave form and to approximate non-linear portions as closely as possible.

As described more fully hereinafter, data for the line segments is stored in digital form in a memory, and digital signals representative of the line segments are derived from the stored data. These digital signals are then converted to analog form to provide the desired output signal. As illustrated in FIG. 2, the stored data includes amplitude, time and slope signals for each of the line segments. The amplitude signals and time signals are numbers corresponding to the differences in amplitude and time between the end points of the segments, and the slope signals indicate the polarities of the slopes of the line segments. For example, the amplitude of segment 0 changes from 0 to 2 in a time of 6, and consequently, the signals stored for this segment correspond to an amplitude change of 2, a time change of 6, and a positive slope. In the event of an instantaneous change in the amplitude of the wave form, a JUMP signal is stored, and the digital output signal is incremented or decremented directly in response to the JUMP signal. In addition to the data for the control signal, EVENT 1 and EVENT 2 signals are stored to provide ON-OFF control of two additional functions at desired times relative to the analog signal. In the example of FIGS. 1 and 2, an EVENT 1 signal is stored for actuating a device such as a motor or valve between times 0 and 20, and an EVENT 2 signal is stored for actuating a second device from time 45 to time 60.

In the system of FIG. 3, the memory comprises a programmable read-only memory (PROM) 16 having a capacity of 32 words, each eight bits wide and addressable by ADDRESSES 0–31. In the preferred embodiment, the first six bits of the words at ADDRESSES 0–15 are used for storing time data, the 7th bits of these words are used for storing slope polarity data, and the 8th bits of these words are used for storing JUMP signal data. The first 6 bits of the words at ADDRESSES 16–31 are used for storing amplitude data, and the 7th and 8th bits of these words are used for storing EVENT 1 and EVENT 2 data. Since the time and amplitude data is split between words, two addresses are used for each line segment. In the preferred embodiment, the data for segment 0 is stored at ADDRESSES 0 and 16, and the data for segment 1 is stored at ADDRESSES 1 and 17, and so on. As illustrated, PROM 16 has address inputs A0-A4 and word outputs 1-8.

Address signals are applied to inputs A0-A3 by a binary address counter 17 which receives one input pulse each time data for a new line segment is desired. Switching between the time and amplitude data for a given line segment is controlled by a timing signal applied to input A4 as hereinafter described in greater detail.

Means is provided for storing the amplitude and event data for a given line segment while the time, slope and jump data for that segment are being read from PROM 16. This means comprises an 8-bit latch 18 connected to word outputs 1-8 of the PROM. The latch has an amplitude section 18a comprising bits 1-6 and an EVENT section 18b comprising bits 7-8.

Timing and control circuits for the system include a crystal controlled oscillator 21, timing and control logic 22, and a time base selector 23. The oscillator can be of conventional design and, in the preferred embodiment, operates at a frequency of 3.932 MHz. The time base selector comprises a series of decade and divide-by-12 counters which divide the output of the oscillator to provide output pulses at a predetermined rate. In the preferred embodiment, output rates of 983 KHz, 16.38 KHz, 273 Hz and 11.37 Hz are provided for time units of seconds, minutes, hours and days, respectively, and a manually operable switch 24 provides means for selecting the desired output pulse rate. A second set of counters in the time base selector provides a predetermined number of pulses of the desired unit for each cycle of operation. In the preferred embodiment, cycles of 1, 2, 3, 6, 12, 15 or 30 times the base unit can be selected by a switch 25 to provide cycles ranging in duration from 1 second to 30 days. Each cycle is divided into 60 equal parts or intervals, and the time per interval can range from 1/60 second to 12 hours.

Means is provided for processing the amplitude and time data stored in PROM 16 to provide digital interpolations between the end points of the line segments which are fitted to the desired wave form. This means includes a rate multiplier 26 and a dividing counter 27. The clock input of rate multiplier 26 is connected to the output of time base selector 23, and the rate multiplier receives clock pulses at the rate determined by switch 24. The rate multiplier includes a divide-by-64 section 26a which delivers one output pulse for each 64 clock pulses applied to the input of the multiplier. This output can be referred to as the base rate and, as discussed more fully hereinafter, is utilized as a reference in resetting the system at the end of each line segment. The rate multiplier also includes a second section 26b which receives inputs from section 26a and from the outputs of the amplitude section of latch 18. Section 26b produces an output signal consisting of a number of pulses corresponding to the product of the base rate and the number stored in the amplitude section of the latch. Thus, it can be seen that rate multiplier 26 delivers up to 63 output pulses for each clock pulse applied thereto, depending upon the change in amplitude for a particular line segment.

The output of section 26b of the rate multiplier is connected to the clock input of counter 27, which has preset inputs connected to word outputs 1-6 of PROM 16. Counter 27 serves to divide the signal from the rate multiplier by the time change information stored in the PROM for each line segment. The output of counter 27 is a succession of digital pulses which, as discussed hereinafter, are counted and converted to an analog voltage which increases or decreases in a stepwise fashion at a rate corresponding to the slope of each successive line segment. The number of steps for each line segment is determined by the rate of the clock pulses and the change in amplitude for the segment, and the pulse rate is preferably chosen to provide a relatively large number of small steps so that the output voltage will conform closely to each segment.

In order to provide a smoother, more symmetrical output wave form, clock pulses are delivered to rate multiplier 26 at a rate R times the rate desired for the output signal, and the signal from counter 27 is divided by R. In the preferred embodiment, the input pulses are delivered at 64 times the desired rate, and the output counter 27 is connected to the input of a divide-by-64 counter 28.

Means is provided for counting the pulses delivered by counters 27 and 28 and thereby converting the digital signal from these counters from a 6-bit serial format to an 8-bit parallel format. This means includes an 8-bit up/down binary counter 31 having a clock input connected to the output of counter 28. Counter 31 has an up/down count control input connected to output 7 of PROM 16, whereby the count in counter 31 is incremented or decremented according to the polarity of the slope of the line segment. Counter 31 also preset inputs the six most significant bits of which are connected to the outputs of the amplitude section of latch 18. As described more fully hereinafter, the amplitude signals are transferred directly from the preset inputs to the outputs of counter 31 in the event of an instantaneous change in amplitude of the output waveform.

The outputs of counter 32 are connected to the inputs of an 8-bit digital-to-analog converter 32. A reference current for the D/A converter is provided by a reference voltage $V_{REF}$ applied to an input terminal 33 connected to the inverting input of an operational amplifier 34 having unity gain through an impedance matching amplifier 35. The output of the amplifier is connected to the reference input of the D/A converter, and the amplifier delivers a reference current corresponding to the reference voltage to the converter. The analog output of the converter is a percentage of the reference current determined by the 8-bit binary output from counter 31. A binary word 00000000 from the counter will cause zero output current, while the word 11111100 will produce full scale output. Between these two extremes, there are 252 increments of output.

The output of D/A converter 32 is connected to the input of an inverting operational amplifier 36 which serves to convert the output current to a voltage. A potentiometer 37 is connected between the input and the output of amplifier 36 and provides means for adjusting the gain of the amplifier. The output of amplifier 36 is connected to the inverting input of an operational amplifier 38 having unity gain, and the output of this amplifier is connected to an output terminal 39. A switch 41 is provided for grounding the non-inverting input of either amplifier 34 or amplifier 38 to operate one of these amplifiers in an inverting mode, whereby a reference voltage of either positive or negative polarity can be utilized to provide an output signal of corresponding polarity.

Means is provided for detecting the end of a time period and delivering a signal to address counter 17 to cause new data to be read out of PROM 16. This means includes a divide-by-64 counter 46 connected to the base rate output of multiplier 26. The action of counter 46 serves to offset the time change introduced by symmetricalizing counter 28. The output of counter 46 is connected to the input of a divide-by-4 counter 47 which serves to offset the timing change introduced by the first two stages of counter 31 in converting from a base $2^6$ to a base $2^8$.

The output of counter 47 is connected to the input of a time counter 48 which serves to convert the compensated base rate signal from serial to parallel format. The outputs of counter 48 are connected to a 6-bit time comparator 49. The comparator receives a second set of inputs from outputs 1–6 of PROM 16. When the output of time counter 48 equals the value of the time word from the PROM, comparator 49 delivers a pulse to address counter 17 via line 51 to address new data in the PROM.

Means is provided for indicating the amount of time which has elapsed during an operating cycle. This means includes a binary counter 51 having a clock input connected to the output of counter 46. The outputs of counter 51 are connected to the inputs of a digital-to-analog converter 52, and the output of this converter is connected to a current responsive meter 53. A constant reference current is applied to converter 52, and counter 51 is reset at the outset of each run or cycle. Thus, meter 53 indicates the elapsed time as a percentage of the run time, with the total run time being determined by the time base setting of switches 24 and 26.

Means is also provided for indicating the amplitude of the output signal. This means includes a digital-to-analog converter 56 having inputs connected to the outputs of counter 31. The output of converter 56 is connected to a current responsive meter 57, and a constant reference current is applied to the converter. Consequently, meter 57 indicates the percent of the reference voltage $V_{REF}$ delivered to output terminal 39, regardless of the level and polarity of the input voltage.

A plurality of control switches are connected to timing and control logic 22 to enable an operator to control the operation of the system. In the preferred embodiment, these switches are normally open push-button switches, and they include a RESET switch 61, a PRESET switch 62, a RUN switch 63, a HOLD switch 64 and a SLEW switch 66. Closure of RESET switch 61 at any time sets the time base to zero, sets the analog output voltage to zero, and turns off EVENTS 1 and 2. PRESET switch 62 is used for setting the analog output voltage level and the EVENT outputs to the points programmed in the first entry of PROM 16. Closure of RUN switch 63 conditions the system to begin or resume operation, and HOLD switch 64 can be closed to stop the operation at any time without changing the analog or EVENT outputs. Closure of SLEW switch 66 causes the system to go through a complete program in a predetermined time, such as 15 seconds. This switch can be used to accelerate the completion of a program that has been started or, when used in conjunction with HOLD switch 64, to advance the program to a desired point, as indicated by time meter 53 and amplitude indicator 57. It can also be used to provide a quick check of the entire program in the PROM.

A power-on reset circuit 67 is connected to the timing and control logic network for conditioning the network to reset the system when operating power is first applied.

The timing and control network also receives input signals signifying the end of a line segment, the end of an operating cycle or run, and the occurrence of an instantaneous change in the amplitude of the output wave form. These inputs are applied to the network via lines 71, 72 and 73, from comparator 49, address counter 17, and output 8 of PROM 16, respectively.

Control signals are delivered from network 22 to the remainder of the system on control lines 76–79. Control line 76 is a reset line by which reset signals are applied to time base selector 23, address counter 17, latch 18, up/down counter 31, and counters 47, 49 and 51.

Control line 77 is a preset line which is connected to the LOAD input of up/down counter 31 which controls the transfer of the amplitude signals from the preset inputs of the counter to the outputs of the counter. The control logic delivers a preset signal on line 77 in response to either closure of PRESET switch 62 or the presence of a JUMP signal on input line 73.

Control line 78 is connected to address input A4 of PROM 16 and controls the switching of the PROM between time and amplitude data. Control line 79 is connected to latch 18, and the signal on this line conditions the latch for transferring the data from the outputs of PROM 16 to the outputs of the latch. The timing of the signals on lines 78 and 79 is such that the PROM switches between the amplitude and time data once for each line segment and only the amplitude data is transferred to the latch.

Operation and use of the system of FIG. 3, and therein the method of the invention, for producing the output waveform of FIG. 1 can now be described. It is assumed that the data of FIG. 2 has been stored in PROM 16 in the manner described hereinbefore, that switches 24 and 25 have been set to provide a time base of 60 seconds, that a suitable reference voltage is applied to input terminal 33, and that potentiometer 37 and switch 41 are set to provide a desired full scale output voltage. When power is applied to the system, the time base is set to zero, the analog output voltage is set to zero, and EVENTS 1 and 2 are turned off. Operation is commenced by closing RUN switch 63. With the 60-second time base, clock pulses are delivered to rate multiplier 26 at the rate of 983 thousand pulses per second. The amplitude data for line segment 0 is stored temporarily in latch 18, and since the amplitude of this segment changes by 2 units, rate multiplier 26 delivers 2 output pulses in response to every 64 clock pulses. Counter 27 delivers one output pulse for each N input pulse applied thereto until the number of pulses occurring at the base rate and stored in counter 48 is equal to N, N being the value of the time word from PROM 16 for the line segment. Since line segment 0 has a time change of 6 units, counter 27 delivers one output pulse for every 6 input pulses applied thereto. When the count in counter 48 reaches the value of the time word for a line segment, the data for the next segment is addressed, and this process continues until the data for all 16 line segments has been combined.

The output of counter 27 is divided by 64 in counte 28 to provide a more symmetrical signal, and the output pulses from counter 28 are counted by counter 31, with the polarity of the slope of the line segment determining the direction of the count. Counter 31 thus converts the digital signals from serial to parallel format, and D/A converter 32 causes an analog voltage to be delivered to output terminal 39 in accordance with the count in counter 31. This voltage increases or decreases by one increment in response to each pulse from counter 28, and as pointed out above, a large number of small increments is provided for each line segment so that the output voltage will conform closely to each segment.

In the event of an instantaneous jump in the amplitude of the output wave form, the amplitude data from latch 18 is transferred directly to the output of counter 31, whereby the output voltage is instantaneously increased or decreased to the final level for the segment in a single step.

EVENT 1 and EVENT 2 signals are provided at the outputs of section 18b of latch 18 during the first 20 seconds and the last 15 seconds of the analog control signal. These signals can be applied to relays or other suitable switching devices for controlling the operation of devices such as motors and valves.

As mentioned above, time indicator 53 shows the percentage of the run that has been completed, and amplitude indicator 57 indicates the percent of the reference voltage which is delivered to output terminal 39 at a given time. Operation of the system can be interrupted during a run by closing HOLD switch 64, and it can be resumed by closing RUN switch 63 or restarted by closing RESET switch 62. Similarly, completion of a run can be accelerated by closing SLEW switch 66.

The invention has a number of important features and advantages. The output wave form is generated digitally, which assures accuracy and repeatability. All data for the wave form is stored in a PROM which can be readily changed to provide different wave forms. A wide variety of time bases are available and can be readily selected, and control signals can be provided for operations as short as 1/64 second or as long as 30 days. By operating at a high clock rate and dividing the output signal down, uneven pulse spacings in the output signal tend to be averaged out to provide a more symmetrical output signal. Furthermore, the use of a relatively large number of small increments for each line segment provides an output signal which corresponds closely to the desired waveform.

It is apparent from the foregoing that a new and improved network for generating an analog control signal have been provided. While only the presently preferred embodiments have been described, as will be apparent to those familiar with the art, certain changes and modifications can be made without departing from the scope of the invention as defined by the following claims.

What is claimed is:

1. In a method utilizing digital storage means, signal processing circuitry and a digital-to-analog converter for generating an analog control signal having an amplitude which varies with time according to a predetermined waveform, the steps of: storing a plurality of amplitude signals representative of the changes in amplitude between predetermined points in the analog waveform, storing a plurality of time signals representative of the time intervals between the predetermined points, providing pulses at rates corresponding to successive ones of the stored amplitude signals, counting the pulses and providing an output pulse each time the count reaches a number corresponding to one of the stored time signals, converting the output pulses to an analog output signal which advances in stepwise fashion along line segments interconnecting the predetermined points, storing a jump signal indicative of the occurrence of an instantaneous change in the amplitude of the analog signal and converting one of the stored amplitude signals directly to analog form to provide the output signal in response to the jump signal.

2. The method of claim 1 wherein the amplitude and time signals are stored at separately addressable locations in a single memory device and the amplitude signals for each line segment are stored in and auxiliary store prior to addressing the memory location where the time signals for the segment are stored.

3. The method of claim 1 wherein the first named pulses are provided by generating clock pulses at a predetermined rate and delivering N pulses in response to each clock pulse, where N corresponds to the change in amplitude represented by each of the amplitude signals.

4. The method of claim 1 wherein the output pulses are counted to provide a digital signal having a parallel format and the last named signal is converted to analog form to provide the analog signal.

5. The method of claim 4 wherein signals corresponding to the polarities of the slopes of the line segments are stored and the output pulse count is incremented and decremented in accordance with the polarity signals.

6. In a system for generating an analog control signal having an amplitude which varies with time according to a predetermined waveform: digital memory means for storing amplitude and time signals respectively representative of changes in amplitude and time between predetermined points in the analog waveform, means for providing pulses at rates corresponding to successive ones of the stored amplitude signals, counter means responsive to the pulses for delivering an output pulse each time the count reaches a level corresponding to one of the stored signals, digital-to-analog converter means responsive to the output pulses for delivering an analog output signal which advances in a stepwise fashion along line segments interconnecting the predetermined points, means for storing a jump signal indicative of the occurrence of an instantaneous change in the amplitude of the analog signal, means for applying the amplitude signals to preset inputs of the counter means, and means for conditioning the counter to transfer the amplitude signals from the preset inputs directly to the output lines of the counter means in response to the jump signal.

7. The system of claim 6 wherein the memory means comprises a read-only-memory.

8. The system of claim 6 wherein the means for providing pulses comprises a rate multiplier responsive to clock pulses occurring at a predetermined rate and to the amplitude signals for delivering pulses at a rate corresponding to the product of the predetermined rate and a number represented by each of the amplitude signals.

9. The system of claim 6 wherein the digital-to-analog converter means comprises a digital counter responsive to the output pulses and a digital-to-analog converter connected to the output lines of the counter.

10. The system of claim 9 further including means for storing polarity signals corresponding to the polarities of the slopes of the line segments and means for conditioning the counter to count up or down in accordance with the polarity signals.

11. The system of claim 6 wherein the amplitude and time signals are stored at separately addressable locations in the memory means, together with means for successively addressing the amplitude and time signals for each line sigment, and auxiliary storage means for temporarily storing the amplitude signals while the time signals are addressed.

12. In a system for generating an analog control signal having an amplitude which varies with time according to a predetermined waveform: digital memory means for storing amplitude and time signals respectively representative of changes in amplitude and time between predetermined points in the analog waveform, a source of pulses occurring at a predetermined rate, rate multiplier means responsive to the pulses and to the amplitude signals for delivering pulses at rates corresponding to the product of the predetermined rate and numbers represented by the amplitude signals, means for dividing the pulses from the multiplier means by numbers corresponding to the time signals to provide output pulses defining stepped line segments interconnecting the predetermined points of the output waveform, digital counting means responsive to the output pulses, digital-to-analog converter means connected to the outputs of the counting means for delivering an analog output signal corresponding to the stepped line segments, means for storing jump signals indicative of the occurrence of instantaneous changes in the amplitude of the analog waveform, means for applying the amplitude signals to preset inputs of the counting means, and means responsive to the jump signals for conditioning the counting means to transfer the amplitude signals directly from the preset inputs to the outputs of the counting means.

13. The system of claim 12 wherein the amplitude and time signals are stored at separately addressable locations in the memory means and auxiliary storage means is included for storing the amplitude signals for one segment while the time signals for said segment are addressed.

14. The system of claim 12 further including means for storing signals corresponding to the polarities of the slopes of the line segments, and means for conditioning the counting means to count up or down in accordance with the polarity signals.

* * * * *